United States Patent [19]

Eminger

[11] 3,724,515
[45] Apr. 3, 1973

[54] APPARATUS FOR WINDING TWO POLE DYNAMOELECTRIC MACHINE FIELD COILS

[75] Inventor: Robert J. Eminger, Fort Wayne, Ind.

[73] Assignee: Essex International Inc., Fort Wayne, Ind.

[22] Filed: Dec. 28, 1970

[21] Appl. No.: 101,587

[52] U.S. Cl.................140/92.1, 29/205 R, 29/596, 29/605, 242/7.03, 242/7.09
[51] Int. Cl..............................................B21f 3/04
[58] Field of Search....29/596, 605, 205 R; 140/92.1, 140/92.2; 242/7.14, 7.09, 7.03

[56] References Cited

UNITED STATES PATENTS

| | | | |
|---|---|---|---|
| 3,525,147 | 8/1970 | Kieffer | 29/596 |
| 3,036,603 | 5/1962 | Moore | 140/92.1 |
| 2,011,114 | 8/1935 | Papin | 29/605 UX |
| 3,514,837 | 6/1970 | Smith | 29/596 X |
| 3,579,791 | 5/1971 | Arnold | 29/596 X |

*Primary Examiner*—Richard J. Herbst
*Assistant Examiner*—Carl E. Hall
*Attorney*—Hood, Gust, Irish, Lundy & Coffey

[57] ABSTRACT

A method and apparatus for winding field coils for a two pole dynamoelectric machine stator core member, the field coils comprising first and second pole groups of coils each having a plurality of progressively smaller concentric coils. In accordance with the method, the first pole group of coils is wound, without severing the wire from which the coils are wound, upon the first of two stepped, collapsible coil forms with the first coil form being expanded and at a winding position and the second of the coil forms being at an inactive position. Each of the coil forms has a forward distal end and a rear proximal end mounted on a rotatable turret, the smaller step of each coil form being adjacent its distal end and the largest step being adjacent its proximal end. The winding of the first pole group commences with winding of the smallest coil on the smallest step of the first coil form, progresses rearwardly toward the proximal end, and concludes with winding of the largest coil on the largest step of the first coil form. The turret is then indexed, still without severing the wire, thereby to move the first coil form with the coils wound thereon to the inactive position and to move the second coil form to the winding position. The second pole group of coils is then wound, still without severing the wire, upon the second coil form which is expanded and in its winding position, the winding of the second pole group commencing with the winding of the largest coil on the largest step of the second coil form, progressing forwardly toward the distal end, and concluding with the winding of the smallest coil on the smallest step of the second coil form. Finally, the coil forms are collapsed and the coils are removed therefrom.

11 Claims, 27 Drawing Figures

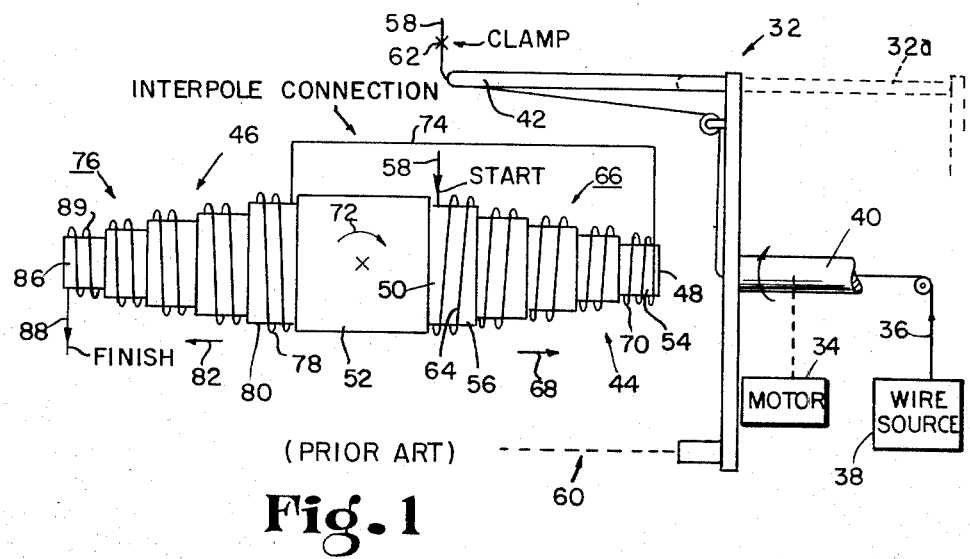
Fig.1 (PRIOR ART)
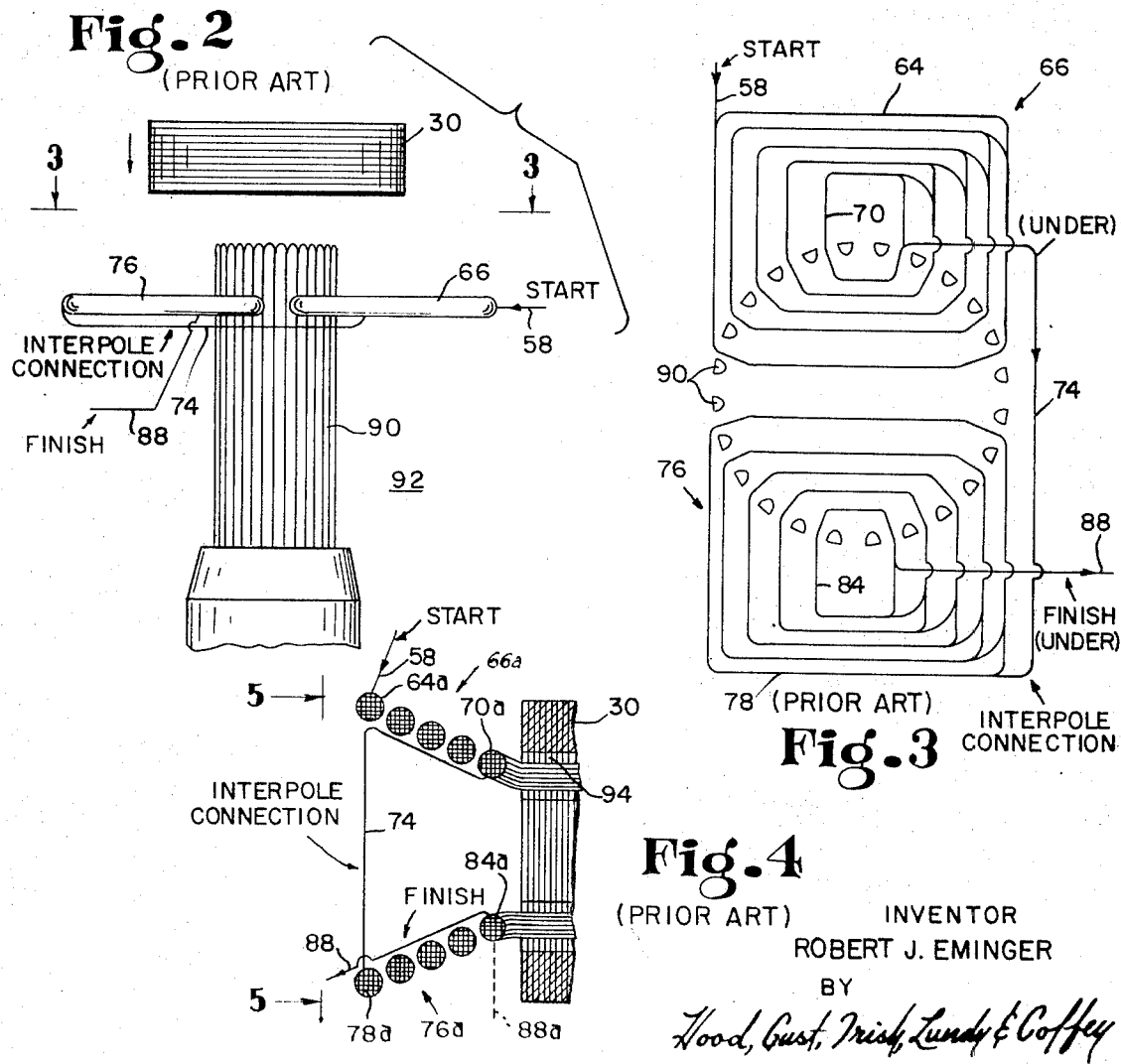
Fig.2 (PRIOR ART)
Fig.3 (PRIOR ART)
Fig.4 (PRIOR ART)
INVENTOR
ROBERT J. EMINGER
BY
Hood, Gust, Irish, Lundy & Coffey
ATTORNEYS INVENTOR
ROBERT J. EMINGER
BY
Hood, Gust, Irish, Lundy & Coffey
ATTORNEYS

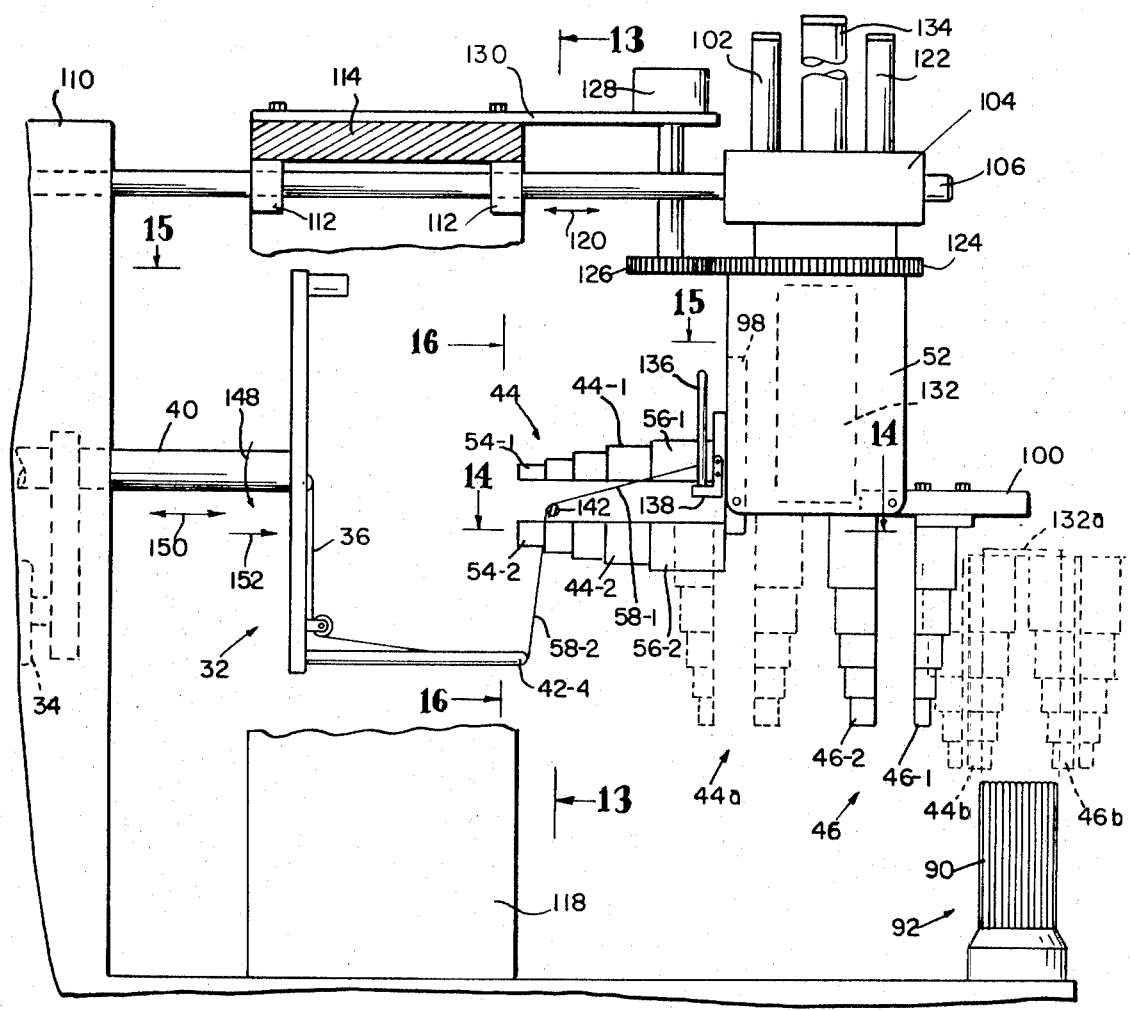

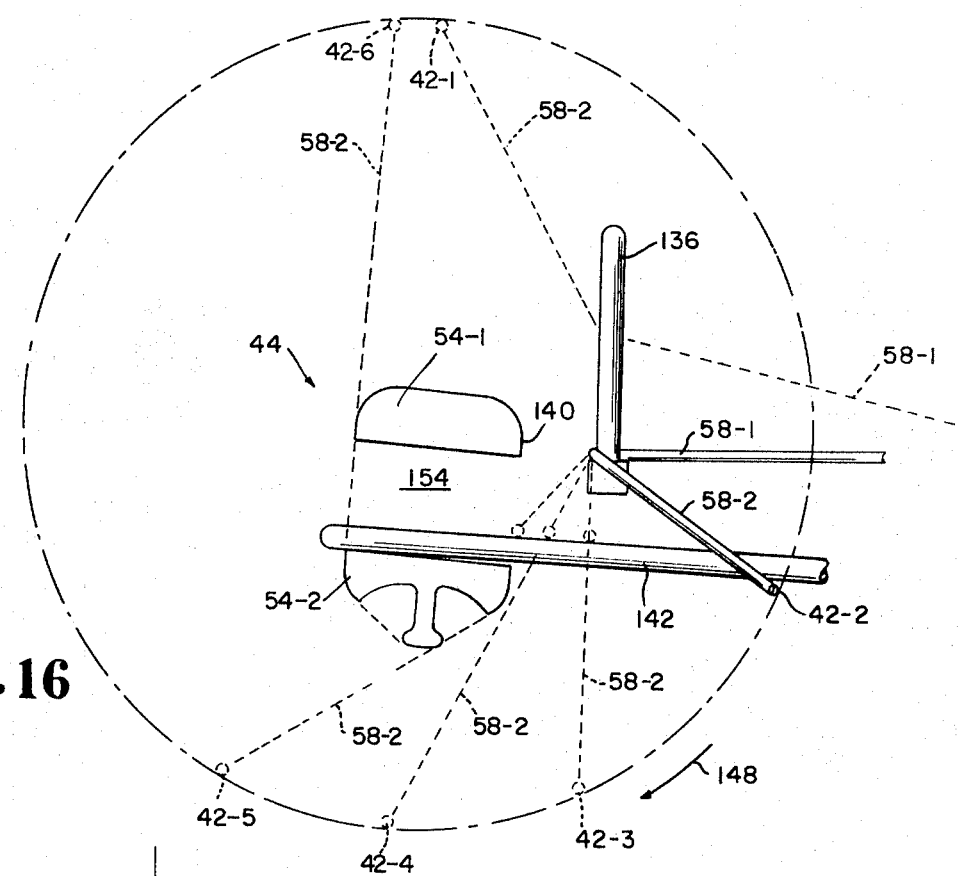
Fig. 16
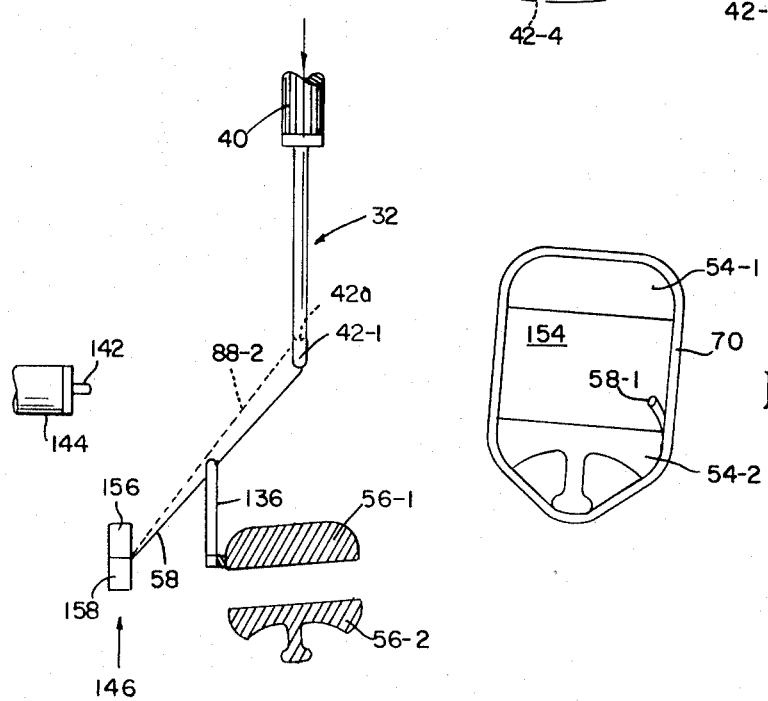
Fig. 19
Fig. 14

INVENTOR
ROBERT J. EMINGER

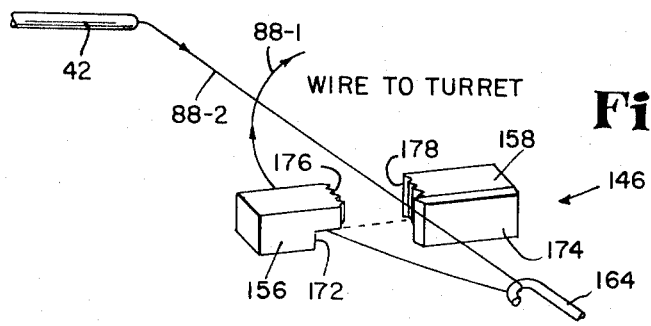
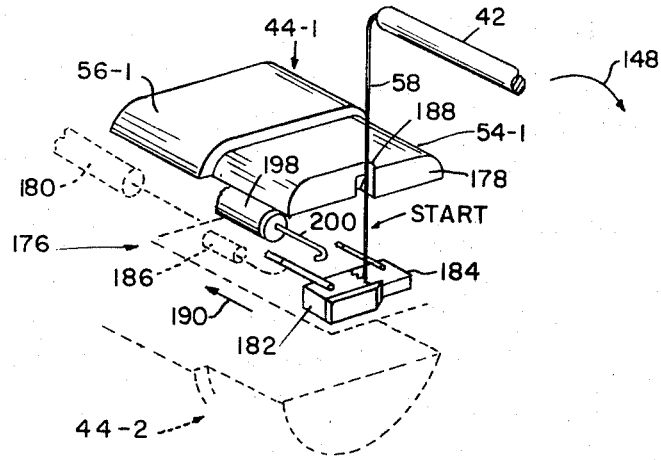
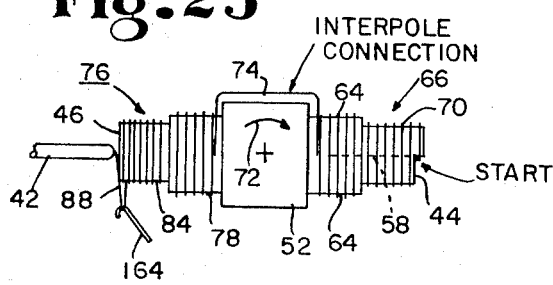
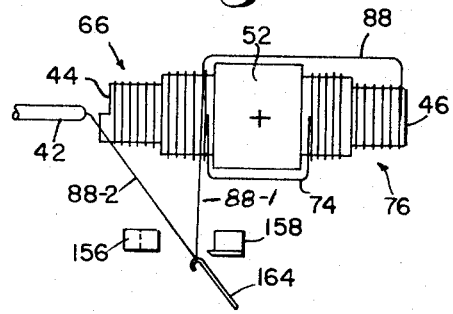
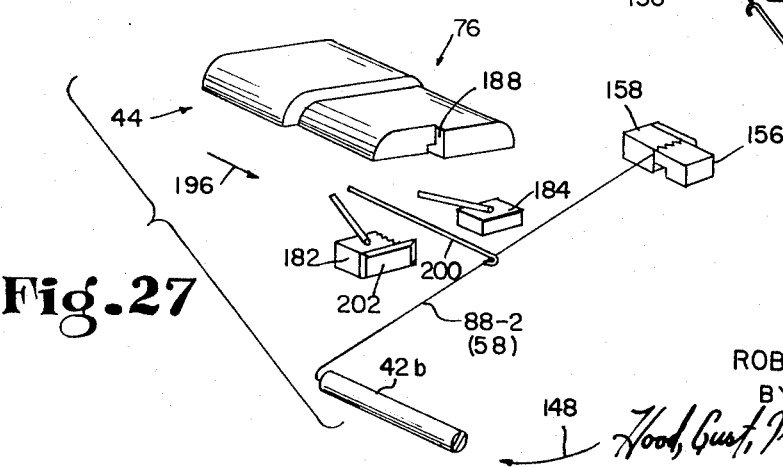

APPARATUS FOR WINDING TWO POLE DYNAMOELECTRIC MACHINE FIELD COILS

BACKGROUND OF THE INVENTION

1. Field of the Invention

This invention relates generally to a method and apparatus for winding field coils for a two pole dynamoelectric machine stator core member, and more particularly to such a method and apparatus wherein the smallest coil of a first pole group of coils is wound upon the smallest step of a first of two stepped coil forms, the remaining coils of the first pole group being wound progressing rearwardly toward the largest step of the first coil form, the coil forms are then indexed, the largest coil of the second pole group of coils is then wound on the largest step of the other coil form, and the remaining coils of the second pole group are wound progressing forwardly to the smallest step of the other coil form.

2. Description of the Prior Art

Each of the main and auxiliary windings for a two pole, single-phase alternating current induction motor conventionally comprises first and second pole groups of coils with each pole group having a plurality of progressively smaller concentric coils. In the past, such coils were wound on a rotatable arbor having, from one end to the other, a first series of progressively larger steps for forming the coils of one pole group, followed by a second series of progressively smaller steps for forming the coils of the other pole group. In such prior arbor-type coil winders, the coils were wound on the steps of the arbor by threading the end of the magnet wire extending from a reel of wire through a wire guide and attaching the end to the smallest step at one end of the arbor. The arbor was then rotated thereby to wind the wire thereon and the wire guide was traversed toward the other end of the arbor thereby progressively winding the coils on the first and second series of steps. With this prior method of winding two pole field coils employing a rotatable arbor winder, the winding progressed from the smallest to the largest coil of one pole and then from the largest to the smallest coil of the other pole, the interpole connection thus extending directly between the two largest coils and being relatively short.

More recently, such two pole field coils have been commonly wound by a flyer-type winder having two stepped coil forms mounted upon a rotatable turret, the flyer being axially movable between extended and retracted positions. Since the starting end of the wire which extends to the flyer and which is secured prior to commencing winding cannot extend across the path of rotation of the flyer, in the past the flyer has initially been extended and the winding has been commenced upon the largest step of one coil form, the flyer then being progressively retracted so as to wind the wire on the progressively smaller steps concluding with winding of the smallest coil on the smallest step. The turret has then been indexed so as to position the other coil form in winding relationship with the flyer and the winding process has been repeated, i.e., the flyer has again been extended so as to wind the largest coil upon the largest step of the other coil form and is again retracted progressively to wind the coils on the progressively smaller steps concluding with winding of the smallest coil on the smallest step of the other coil form. With this commonly employed prior method and apparatus, the starting end of the wire extends from the largest coil of one pole, the interpole connection extends from the smallest coil of that pole to the largest coil of the second pole, and the finishing end extends from the smallest coil of the second pole.

Such prior two pole flyer winders have been combined with apparatus for inserting coils into the slots of a dynamoelectric machine stator core member, such inserting apparatus being shown in U.S. Pat. No. 3,324,536, and such combined apparatus being shown in U.S. Pat. No. 3,415,292 and in my co-pending United States Patent application Ser. No. 813,798 assigned to the assignee of the present application. In such combined apparatus, the coil forms are provided with a clearance to accommodate the blades of the coil inserting apparatus so that the coils may be transferred directly from the coil forms to the inserter blades. Following such transfer of the coils, a stator core member is positioned over the inserter blades and the coils are injected into the slots of the core member.

After insertion of the coils wound by such prior flyer apparatus, the interpole connection which extends from the smallest coil of one pole group to the largest coil of the other pole group necessarily extends across the end turns of one of the pole groups. It will be understood that a substantial potential gradient exists between the smallest and largest coils of a pole group and with the interpole connection extending across the end turns of a pole group, there is a possibility that the interpole connection may short circuit one or more of the coils. It will be readily seen that if the interpole connection should short circuit the largest coil, the entire pole will be short circuited.

It is therefore desirable to provide a method and apparatus for winding two pole dynamoelectric machine field coils wherein the winding of the coils commences with the smallest coil of one pole and concludes with the smallest coil of the other pole, the interpole connection thus extending between the largest coils of the two poles so as to eliminate the possibility of the interpole connection short circuiting one or more coils of one pole.

SUMMARY OF THE INVENTION

The invention, in its broader aspects, provides a method of winding field coils for a two pole dynamoelectric machine stator core member, the field coils comprising first and second pole groups of coils each having a plurality of progressively smaller concentric coils. The method comprises the steps of first, without severing the wire from which the coils are wound, winding the first pole group of coils upon the first of two stepped, collapsible coil forms with the first coil form being expanded and at a winding position, the second of the coil forms being at an inactive position. Each of the coil forms has a forward distal end and a rear proximal end mounted on a rotatable turret with its smallest step being adjacent its distal end and its largest step adjacent its proximal end. The winding of the first pole group commences with the winding of the smallest coil on the smallest step of the first coil form, progresses rearwardly toward the proximal end, and concludes with winding of the largest coil on the largest step of the first coil form. Secondly, still without severing the wire, the turret is indexed thereby to move the first coil form with the coils wound thereon to the inactive position and the second coil form to the winding position. Thirdly, still without severing the wire, the second pole group of coils is wound on the second coil form with the second coil form being expanded and at the winding position. The winding of the second pole group commences with winding of the largest coil on the largest step of the second coil form, progresses forwardly toward the distal end, and concludes with winding of the smallest coil on the smallest step of the second coil form. Finally, the coil forms are collapsed and the coils are removed therefrom.

The apparatus of the invention, in its broader aspects, comprises first and second stepped, collapsible coil forms each having a forward distal end and a rear proximal end mounted on a rotatable turret with its smallest step being adjacent its distal end and its largest step adjacent its proximal end. Means are provided for winding wire on the coil forms, and means are provided for rotating the turret thereby sequentially to position the coil forms in winding relationship with the winding means. Means are provided for holding the starting end of the wire on which the coils are wound which extends from the winding means at a location adjacent the smallest step of one of the coil forms at its winding position and within the path of rotation of the winding means so that the smallest coil may initially be wound upon the smallest step of the coil form and the remaining coils wound progressing rearwardly toward the proximal end of the coil form.

It is accordingly an object of the invention to provide an improved method of winding field coils for a two pole dynamoelectric machine stator core member.

Another object of the invention is to provide an improved method of winding field coils for a two pole dynamoelectric machine stator core member wherein the interpole connection extends between the largest coils of the two poles.

A further object of the invention is to provide improved apparatus for winding field coils for a two pole dynamoelectric machine stator core member.

Yet another object of the invention is to provide improved apparatus for winding field coils for a two pole dynamoelectric machine stator core member wherein the interpole connection extends between the largest coils of the two poles.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a schematic illustration showing the prior method of winding two pole field coils employing a flyer winder;

FIG. 2 is a side view showing the coils wound by the method and apparatus of FIG. 1 positioned on the blades of coil insertion apparatus;

FIG. 3 is a schematic view showing the coils positioned on the inserter blades taken generally along the line 3—3 of FIG. 3;

FIG. 4 is a fragmentary side cross-sectional view showing the field coils wound with the prior method and apparatus of FIG. 1 inserted in the slots of a stator core member;

FIG. 12 is a side view showing the preferred embodiment of the apparatus of the invention;

FIG. 13 is a fragmentary cross-sectional view taken generally along the line 13—13 of FIG. 12;

FIG. 14 is a fragmentary cross-sectional view taken generally along the line 14—14 of FIG. 12 showing the first step in the winding operation;

FIG. 16 is a fragmentary end view taken generally along the line 16—16 of FIG. 12;

FIG. 19 is a fragmentary end view taken generally along the line 19—19 of FIG. 18;

FIG. 23 is a fragmentary view in perspective further illustrating the cut-off and clamping mechanism;

FIG. 24 is a fragmentary perspective view illustrating another embodiment of the invention;

FIG. 25 is a top view of the embodiment of FIG. 24 following completion of the winding of the two pole groups of coils;

FIG. 26 is a top view similar to FIG. 25 showing the coil forms following indexing from the position shown in FIG. 25; and FIG. 27 is a fragmentary perspective view showing operation of the cut-off and clamping mechanism of the embodiment of FIG. 24.

DESCRIPTION OF THE PREFERRED EMBODIMENTS

Figure 5:
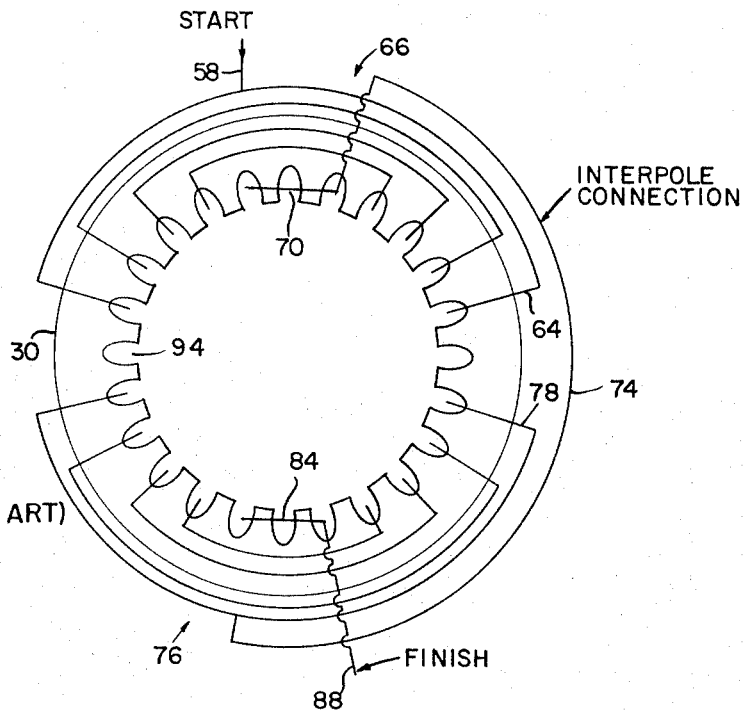
FIG. 5 is an end view of a stator core member having the field coils wound by the prior method and apparatus of FIG. 1 positioned in the slots thereof.

Referring now to FIGS. 1 through 5, the method and apparatus previously employed for winding two pole field coils for a 24 slot stator core member 30 will be described. The apparatus conventionally employed comprises a flyer winder 32 rotated by motor 34 and axially movable between an extended position, as shown in solid lines in FIG. 1, and a retracted position as shown in dashed lines at 32a, as by means of the mechanism described and illustrated in my application Ser. No. 813,798. Wire 36 extends from wire source 38, such as a conventional wire reel, through the center of flyer shaft 40, and thence to gun 42. First and second stepped coil forms 44, 46 are provided each having a distal end 48 and a proximal end 50 mounted on a rotatable turret 52. In the illustrated embodiment, each of the coil forms 44, 46 has five steps with the smallest step 54 being adjacent distal end 48 and the largest step 56 being adjacent proximal end 50.

Starting end 58 of wire 36 extends out of gun 42 of flyer 32 and must be secured prior to rotation of flyer 32 in order to wind the wire onto the coil form to form coils thereon. It will be understood that with starting end 58 secured and flyer 32 rotated thereby to wind wire 36 in coils on the coil form, wire 36 will be withdrawn from wire source 38. It will readily be seen that starting end 58 which extends from the point of securement to the first coil wound on the coil form cannot extend across the path of rotation of flyer 32 shown by the dashed line 60. Thus, in the past, starting end 58 has been clamped, as at 62, at a point spaced rearwardly from the path of rotation of flyer 32 at its rearmost, extended position. This has necessitated initially winding the largest coil 64 of the first pole group of coils 66 on the largest step 56 of the coil form 44, then retracting flyer 32 in the direction shown by the arrow 68 so as sequentially to wind the progressively smaller coils upon the progressively smaller steps with the winding of the first pole group 66 concluding with the winding of the smallest coil 70 upon the smallest step 54. Flyer 32 is then again extended and turret 52 is indexed, as shown by arrow 72, thereby to bring coil form 46 into winding relationship with flyer 32, extension of the flyer and the indexing operation pulling wire from the flyer to form interpole connection 74. Winding of the second pole group of coils 76 then proceeds in the same fashion, i.e., the largest coil 78 is first wound on the largest step 80 of coil form 46, the progressively smaller coils are sequentially wound with flyer 32 being retracted in the direction shown by the arrow 82, and finally the smallest coil 84 is wound on the smallest step 86 of coil form 46.

It is thus seen that the starting end 58 from which the coils are wound extends to the largest coil 64 of the first pole group 66, the interpole connection 74 extends from the smallest coil 70 of the first pole group 66 over the coils of that pole group to the largest coil 78 of the second pole group 76, and that the finishing end 88 extends from the smallest coil 84 of the second pole group 76. It will be understood that flyer 32 is preferably traversed in oscillatory fashion across each coil form step in order to level wind the wire thereon, the flyer being stepped incrementally from winding relationship with one coil form step to winding relationship with the next smaller coil form step upon the completion of winding each coil, such traversing and stepping motion being provided as by means of the mechanism described and illustrated in my application Ser. No. 813,798.

As further described and illustrated in the aforesaid U.S. Pat. No. 3,415,292 and my aforesaid application Ser. No. 813,798, following winding of the first and second pole group of coils 66, 76 on the coil forms 44, 46, the coil forms are pivoted downwardly to an unloading position in closely spaced parallel relationship. The coil forms are provided with clearance so as to permit them to be lowered into intermeshing relationship with the circle of blades 90 of coil insertion apparatus 92, following which the coil forms are collapsed and the coils transferred directly from the collapsed coil forms onto the inserter blades, as shown in FIGS. 2 and 3. Following transfer of the first and second pole group of coils 66, 76 to the inserter blades 90, stator core member 30 is positioned on the inserter blades over the coils and the coils are then injected into the slots 94 thereof (FIG. 5) as further described and illustrated in the aforesaid U.S. Pat. No. 3,324,536.

Referring now particularly to FIGS. 2 and 3, it will be observed that after the first and second pole group of coils 66, 76 have been transferred to the inserter blades 90, interpole connection 74 extends from the smallest coil 70 of pole group 66 under the larger coils to the largest coil 78 of the pole group 76, and that the finishing lead 88 similarly extends from the smallest coil 84 of pole 76 under the larger coils of that pole. Referring now particularly to FIGS. 4 and 5, after the coils have been injected into slots 94 of stator core member 30, it will be seen that interpole connection 74 must cross under end turns 66a on the first pole group and then extend around the bore to end turn 78a of the second pole group 76. It will further be seen that finishing lead 88 must cross under end turns 76a of the second pole group however, following the transfer of the coils to the inserter blades 90 and prior to the positioning of the stator core member 30 thereon, the operator may manually thread finishing lead 88 over end turns 76a, as shown in dashed lines at 88a. Due to vibration and other causes, interpole connection 74 is prone to chafe end turns 66a which it crosses thereby short circuiting one or more of the coils of pole 66 or the entire pole. In the particular case of hermetic motors which are sealed within a casing, repair of such short circuited windings involves substantial expense.

Referring now to FIGS. 6 through 11 in which like elements are indicated by like reference numerals, in accordance with the apparatus and method of the invention, the same stepped coil forms 44, 46, rotatable turret 52, and flyer 32 is employed as in the case of the prior apparatus and method described above in connection with FIG. 1. Here, however, winding of the first pole group of coils 66 commences with the smallest coil 70 on the smallest step 54 of coil form 44, progresses rearwardly as shown by arrow 91 and concludes with winding of the largest coil 64 on the largest coil form step 56. Turret 52 is then indexed, as shown by arrow 72 thereby forming interpole connection 74, and winding of the second pole group of coils 76 then proceeds in conventional fashion commencing with the largest coil 78 on the largest coil form step 80, progressing forwardly in the direction shown by arrow 82, and concluding with winding of the smallest coil 84 on the smallest coil form step 86. It will thus be seen that interpole connection 74 extends between the two largest coils 64, 78 rather than from the smallest coil 70 to the largest coil 78 as in the case of the prior method.

As mentioned above, in order to wind coils on the coil form, the starting end 58 which extends from flyer 32 to securing point 62 cannot extend across the path of rotation 60 of the flyer. Thus, in accordance with the invention, in order to wind the first pole group 66 of coils on coil form 44 commencing with the smallest coil 70 and progressing rearwardly to the largest coil 64, starting end 58 is held, at least initially, adjacent the smallest step 54 and within the path of rotation 60 of flyer 32. In accordance with the preferred embodiment of the invention, starting end 58 is again secured, as at 62, at a point spaced rearwardly from the path of rotation 60 of flyer 32 in its extended position. Starting end 58 then extends to a second point 93 adjacent the proximal end of coil form 44 which is still rearwardly of the path of rotation 60 of flyer 32 in its extended position, thence forwardly to point 95 adjacent smallest step 54 and within the path of rotation 60, and finally to gun 42 of flyer 32. Thus, the smallest coil 70 can initially be wound on the smallest step 54 and, as the winding progresses rearwardly in direction 90, the progressively larger coils are sequentially wound over starting end 58, as shown by dashed line 58a. In accordance with another embodiment of the invention, starting end 58 is clamped at point 97 adjacent the distal end of the smallest step 54 which again is within the path of rotation 60 of flyer 32.

Figure 7:
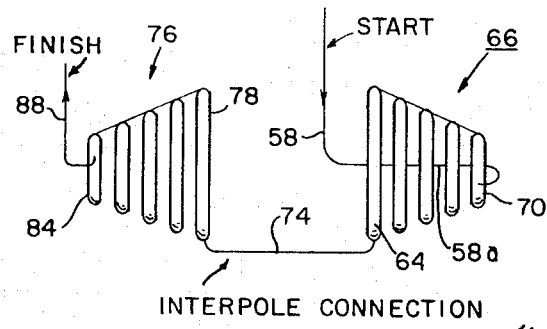
FIG. 7 is a side view showing the coils wound by the method and apparatus of FIG. 6.
Figure 8:
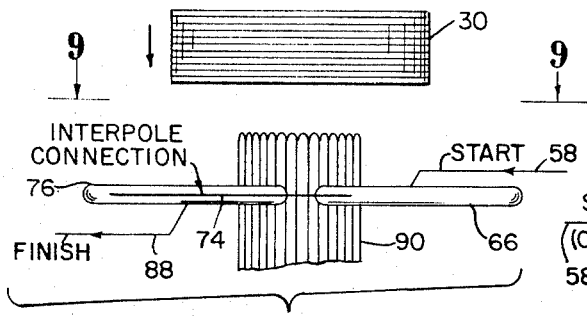
FIG. 8 is a fragmentary side view showing the coils wound by the method and apparatus of FIG. 6 positioned on the blades of coil insertion apparatus.
Figure 9:
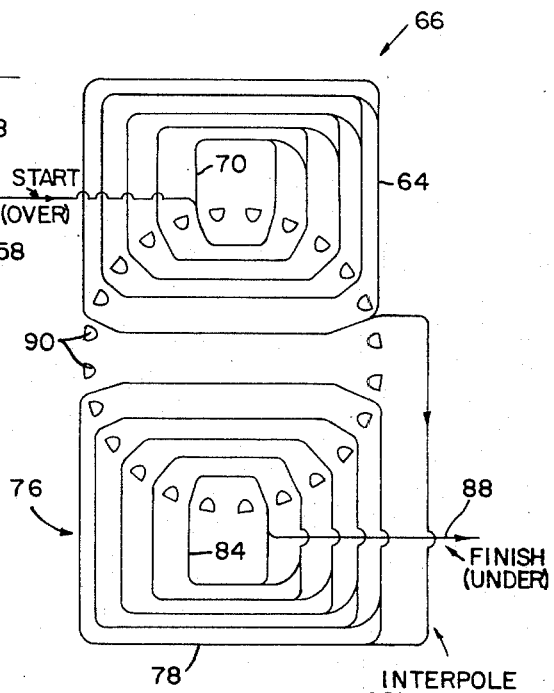
FIG. 9 is a schematic view showing the coils positioned on the inserter blades taken generally along the line 9—9 of FIG. 8.

Referring briefly to FIG. 7 in which the first and second pole groups of coils 66, 76 are shown schematically as they would appear after removal from coil forms 44, 46, but prior to being collapsed into coplanar relationship on inserter blades 90, it will be seen that starting end 58 extends from smallest coil 70 of pole group 66 through the interior of the progressively larger coils of that group, as at 58a. Referring now specifically to FIGS. 8 and 9, it will be seen that after transfer of pole groups 66, 76 to inserter blades 90, starting end 58 extends over the coils comprising the first pole group 66, that finishing end 88 extends under the coils comprising the second pole group 76, and that the interpole connection 74 extends directly between the two largest coils 64, 78.

Figure 10:
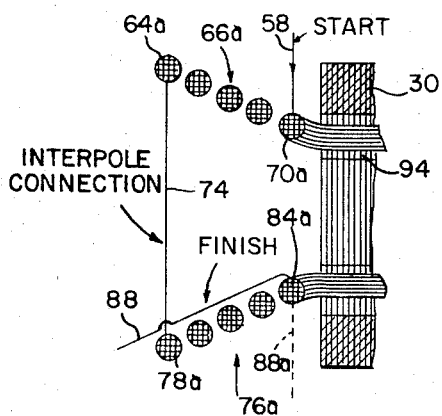
FIG. 10 is a fragmentary cross-sectional view showing the field coils wound by the method and apparatus of FIG. 6 inserted in the slots of a stator core member.
Figure 11:
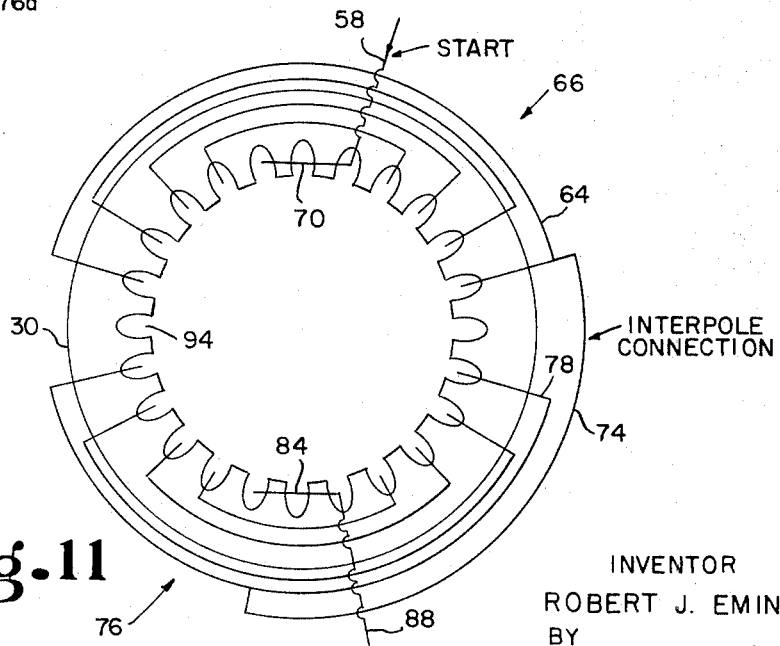
FIG. 11 is an end view of a stator core member having the field coils wound by the method and apparatus of FIG. 6 positioned in the slots thereof.

Referring now to FIGS. 10 and 11, it will be seen that following insertion of pole groups 66, 76 of coils into slots 94 of stator core member 30, starting end 58 will extend outwardly from end turn 70a of smallest coil 70 of pole group 66 without extending over end turns 66a, interpole connection 74 extends around the bore from end turn 64a of the largest coil 64 of pole group 66 to end turn 78a of the largest coil 78 of pole group 76 without crossing any of the end turns 66a, 76a of either pole group, and that finishing end 88 again extends across end turns 76a. However, as in the case of the conventional method, the operator may tuck finishing end 88 over the remaining end turns 76a so that it does not extend across those end turns, as shown by the dashed line 88a. It will now be seen that with interpole connection 74 extending directly between end turns 64a, 78a of the two largest coils of the two pole groups 66, 76 rather than across the end turns of one of the groups, the risk of the interpole connection short circuiting one or more of the coils of one of the pole groups has been eliminated.

Referring now to FIGS. 12 through 23, the preferred embodiment of the apparatus and method of the invention is shown, like elements being indicated by like reference numerals. Here, stepped coil forms 44, 46 are respectively mounted on support plates 98, 100 which are respectively pivotally mounted on turret 52. Coil forms 44, 46 are thus pivotally movable between upper, longitudinally extending positions and downwardly extending, unloading positions, coil form 44 being shown in solid lines in FIG. 12 in its upper position and in dashed lines at 44a at its unloading position, and coil form 46 being shown in its unloading position. While coil form 46 is shown in its downwardly extending, unloading position, both coil forms preferably are simultaneously raised and lowered between their upper and unloading positions by mechanism (not shown) actuated by a suitable fluid power cylinder 102, such mechanism not forming a part of the present invention.

Each of the coil forms 44, 46 comprises a fixed part 44-2, 46-2 secured to the respective support plate 98, 100, and a collapsible part 44-1, 46-1 supported on the respective support plate for movement between collapsed and expanded positions. A suitable camming mechanism (not shown), which also does not form a part of the present invention, expands coil form parts 44-1, 46-1 to their expanded positions upon pivotal movement of the coil forms to their upper positions, and collapses coil form parts 44-1, 46-1 upon movement of the coil forms to their unloading positions.

Turret 52 is supported for rotatable movement, and also for vertical movement between an upper, winding position and a lower, unloading position by block 104 mounted on a pair of longitudinally extending rails 106, 108 which extend rearwardly to housing 110. Rails 106, 108 are supported by bearings 112 on top plate 114 supported by side plates 116, 118 (FIGS. 12 and 13). Rails 106, 108 are also supported by suitable bearings (not shown) in housing 110 for longitudinal movement in the direction shown by the arrows 120 so as to move block 104, turret 52 and coil forms 44, 46 between a forward, winding position, as shown in solid lines in FIG. 12, and a rearward, unloading position. Block 104 and rails 106 are moved longitudinally by means of another suitable fluid power cylinder (not shown). Turret 52 and coil forms 44, 46 are raised and lowered vertically between an upper position, as shown in solid lines in FIG. 12, and a lower unloading position, by another suitable fluid power cylinder 122. Thus, with coil forms 44, 46 pivoted downwardly to their unloading positions, block 104, rails 106, 108, turret 52 and coil forms 44, 46 moved rearwardly, and turret 52 and coil forms 44, 46 moved downwardly, coil forms 44, 46 are in coil-transferring relationship with blades 90 of coil inserter 92, as shown in dashed lines at 44b, 46b. When block 104, rails 106, 108 and turret 52 are in their forward positions, index gear 124 mounted on turret 52 meshes with index drive gear 126 driven by a suitable index drive motor 128 mounted on top plate 114 by bracket 130.

A coil-transferring sleeve, shown in dashed lines at 132, which does not form a part of the present invention, is selectively moved between an upper, inactive position and a lower coil-transferring position, as shown in dashed lines at 132a, by means of another suitable fluid power cylinder 134. Suitable mechanisms by which coil forms 44, 46 may be pivotally moved between their upper and unloading positions and expanded and collapsed, by which turret 52 may be moved longitudinally between its forward and rearward positions and vertically between its upper and coil-transferring positions, and for actuating coil-transferring sleeve 132 between its inactive and coil-transferring positions are described and illustrated in co-pending application Ser. No. 859,148 of the present applicant and Buddy S. Stuckey, and assigned to the assignee of the present application.

In accordance with the preferred embodiment of the method and apparatus of the invention, a first rod 136 is mounted by means of bracket 138 on movable coil form part 44-1 adjacent the rear or proximal end of the largest step 56-1, rod 136 being closely adjacent side 140 of the largest step 56-1 and extending vertically upwardly when coil form assembly 44 is in its upper position. Rod 136 establishes point 93 (FIG. 6) when coil form 44 is in its upper position.

Figure 6:
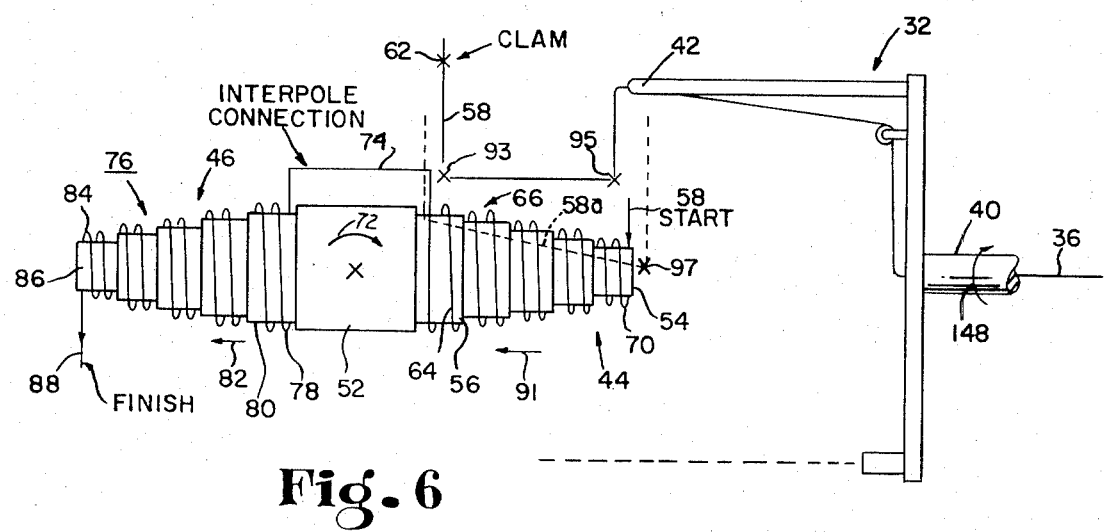
FIG. 6 is a schematic view showing the method of the invention.
Figure 17:
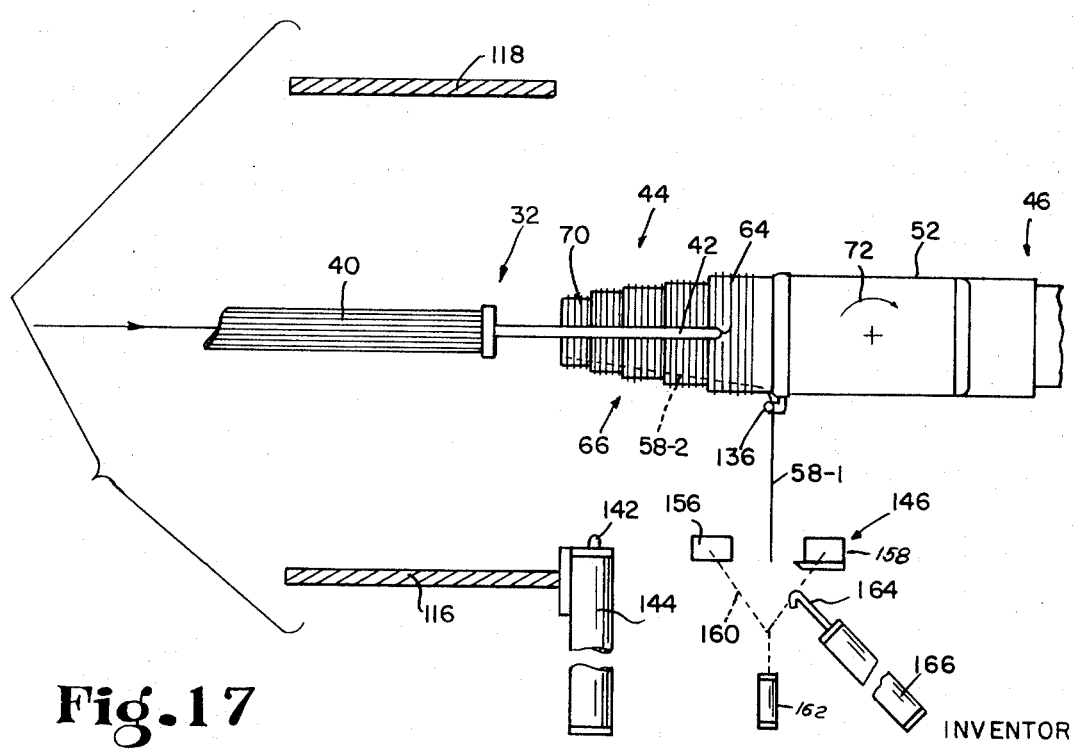
FIG. 17 is a fragmentary cross-sectional view similar to FIG. 15 and showing completion of the winding of the first pole group of coils.

A second rod 142 forms an extension of the piston rod of fluid power cylinder 144 mounted on side plate 116. Rod 142 is selectively movable by actuation of cylinder 144 between a retracted position, as shown in FIG. 17 and in dashed lines at 142a in FIG. 15, in which it is clear of the path of rotation 60 of flyer 32, and an extended position in which it extends transversely into the space between coil form parts 44-1, 44-2 adjacent the rear end of the smallest step 54-1, 54-2, as shown in FIGS. 12, 13, 15 and 16. A clamp and cut-off mechanism 146, to be hereinafter more fully described, is also mounted on side plate 116 by a suitable bracket (not shown). In its extended position, rod 142 defines point 95 (FIG. 6).

Referring now to FIG. 14, with coil form 44 pivoted downwardly to its unloading position 44a (FIG. 12), rod 136 will extend longitudinally forwardly toward flyer 32. With rod 142 retracted, and with gun 42 of flyer 32 in its upper, vertical position 42-1 (FIGS. 13, 14, 15 and 16) and in its initial position in winding relationship with the smallest step 54 (FIGS. 12, 14 and 15), when starting end 58 of wire 36 is clamped in clamping and cut-off mechanism 146, it will extend diagonally across the longitudinally forwardly extending rod 136, as shown in FIG. 14. Coil form assembly 44 (along with coil form assembly 46) is then pivoted upwardly to the position shown in FIGS. 12 and 15 and in dashed lines in FIG. 13, thus causing rod 136 to engage starting end 58 so that a first length of wire 58-1 extends from clamping and cut-off mechanism 146 to rod 136 and a second length 58-2 extends from rod 136 to gun 42 in its upper, initial position 42-1, as shown in dashed lines in FIGS. 13, 15 and 16. Cylinder 144 is then actuated to extend piston rod 142 from its retracted position 142a to its extended position in which it extends into the slot 154 between coil form parts 44-1, 44-2, as shown in FIGS. 12, 13, 15 and 16.

It will be noted in FIGS. 13, 14 and 16 that coil form assembly 44 (and also coil form assembly 46) is disposed at a slight angle with respect to the vertical, such angular positioning of the coil forms, which does not form a part of the present invention, being required in the illustrated embodiment in order properly to position the sides of the coils with respect to the slots defined between inserter blades 90.

Figure 15:
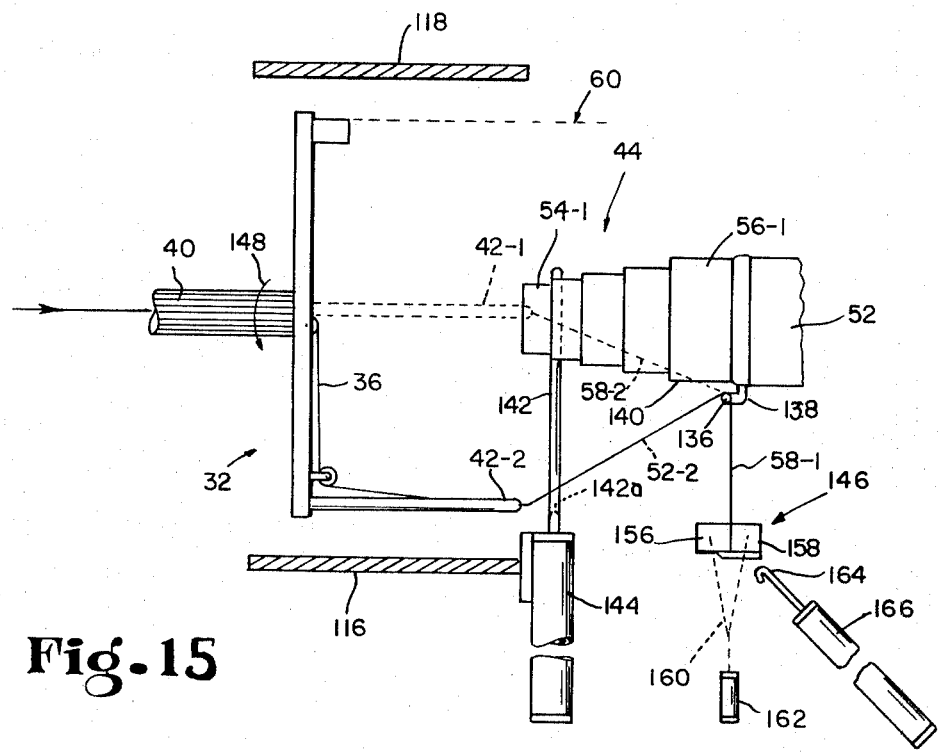
FIG. 15 is a top-cross-sectional view taken generally along the line 15—15 of FIG. 12 and showing the initiation of the winding of the smallest coil of the first pole group of coils.

A clutch-brake mechanism (not shown) is then actuated so that motor 34 drives shaft 40 and flyer 32 in the direction shown by the arrow 148. Referring now particularly to FIGS. 15 and 16, it will be observed that when gun 42 has been rotated in direction 148 from its initial, top position 42-1 to position 42-2, starting wire secton 58-2 is moved so that it extends over and engages rod 142. Referring additionally to FIG. 12, as the rotational movement of gun 42 continues in direction 148, it will be seen that starting end section 58-2 is pulled downwardly around rod 142 and inwardly toward side 140 of coil form assembly 44, rod 142 thus establishing point 95 (FIG. 6) adjacent side 140 of coil form assembly 44 and adjacent the rear end of the smallest step 54. As the rotational movement of gun 42 proceeds in direction 148 from position 42-4 through position 42-5 to position 42-6, it will be seen that starting end section 58-2 is wrapped around the parts 54-2, 54-1 of the smallest step thereby initiating winding of the smallest coil 70. Winding of the smallest coil 70 then proceeds with flyer 32 being rotated in direction 148 and traversed in oscillatory fashion across the length of the smallest step 54, as shown by arrows 150 (FIG. 12) thereby to level-wind the desired number of turns comprising the smallest coil 70.

It will now be observed that rods 136, 142 guide the starting end 58 of the wire from clamping and cut-off mechanism 146 at point 62 (FIG. 6) spaced rearwardly from flyer 32 in its extended position to point 93 closely adjacent the proximal end of coil form 44 and thence along the side 140 of coil form 44 within the path of rotation 60 of flyer 32 to point 95 adjacent the rear end of the smallest step 54, thereby permitting initial winding of smallest coil 70 on the smallest coil form step 54.

A predetermined number of turns in advance of completion of winding of the smallest coil 70 on the smallest step 54, as sensed by a conventional turns counter (not shown), cylinder 144 is actuated to retract rod 142, the number of turns already wound on the smallest coil 70 now anchoring starting end 58. Flyer 32 is then stepped rearwardly by an incremental amount, as shown by arrow 152 (FIG. 12), thereby to position gun 42 in winding relationship with the next larger coil form step and the winding of the next larger coil then proceeds in the same fashion upon that step. The progressively larger coils are then sequentially wound upon the progressively larger steps with the winding of the first pole group 66 concluding with winding of the largest coil on the largest step 56. It will now be observed that starting end section 58-1 extends along the side 140 of coil form 44 in general alignment with slot 154 defined between the upper and lower parts 44-1, 44-2. It will further be seen that as the progressively larger coils are sequentially wound progressing rearwardly toward the proximal end of coil form 44, the progressively larger coils are wound over starting end section 58-1 and push the starting end section into slot 154, as best seen in FIG. 19.

Referring now to FIG. 17, it will be seen that when coil form 44 is in its winding position, the other coil form 46 is at an inactive position. Clamping and cut-off mechanism 146, which does not form a part of the present invention, comprises a pair of movable clamping and cut-off blocks 156, 158 actuated between a closed, cut-off and clamping position, as shown in FIG. 15, and an open position, as shown in FIGS. 17 and 23, by a suitable linkage 160 operated by fluid power cylinder 162. A wire pole-out hook 164 is provided actuated by fluid power cylinder 166 between a retracted position rearwardly of clamping and cut-off mechanism 146, as shown in FIGS. 15, 17, 22 and 23, and an extended position in which it extends through blocks 156, 158 in their open positions, as shown in FIG. 20.

Figure 18:
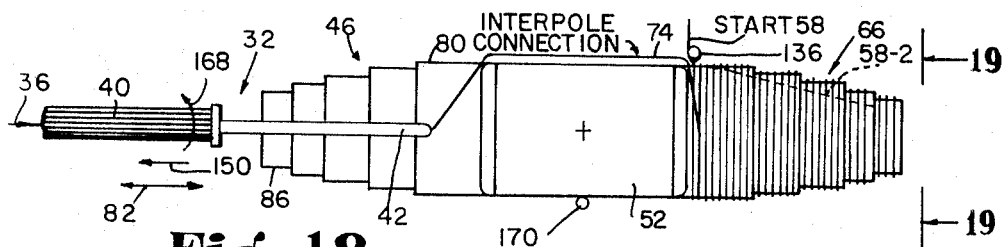
FIG. 18 is a top view similar to FIG. 15 showing the coil forms indexed from the position shown in FIG. 17.

A predetermined number of turns in advance of completion of winding the largest coil 64 of the first pole group 66, as sensed by the turns counter, cylinder 162 is actuated to open cut-off and clamping blocks 156, 158 thereby to release starting end section 58-1, as shown in FIG. 17. Upon completion of the largest coil 64, flyer 32 is stopped with gun 42 in its upper position, as shown in FIG. 17. Turret 52 is then indexed, as shown by arrow 72 thereby to rotate coil form 46 to the winding position in winding relationship with gun 42 of flyer 32, and to rotate the coil form 44 with the first pole group of coils 66 wound thereon to the inactive position, as shown in FIG. 18, this indexing of turret 52 pulling wire from gun 42 to form the interpole connection 74 which is wrapped around turret 52.

The direction of rotation of motor 34, shaft 40 and flyer 32 is then reversed, as shown by arrow 168 and the winding of coils on coil form 46 then proceeds in conventional fashion with the largest coil 78 being first wound on the largest step 80 and the flyer then being retracted step by step, as shown by arrow 82 sequentially to wind the progressively smaller coils on the progressively smaller steps of coil form 46, the winding concluding with winding of the smallest coil 84 upon the smallest coil form step 86. Flyer 32 is traversed in oscillatory fashion, as shown by arrows 150, during the winding of each coil on each step.

Figure 20:
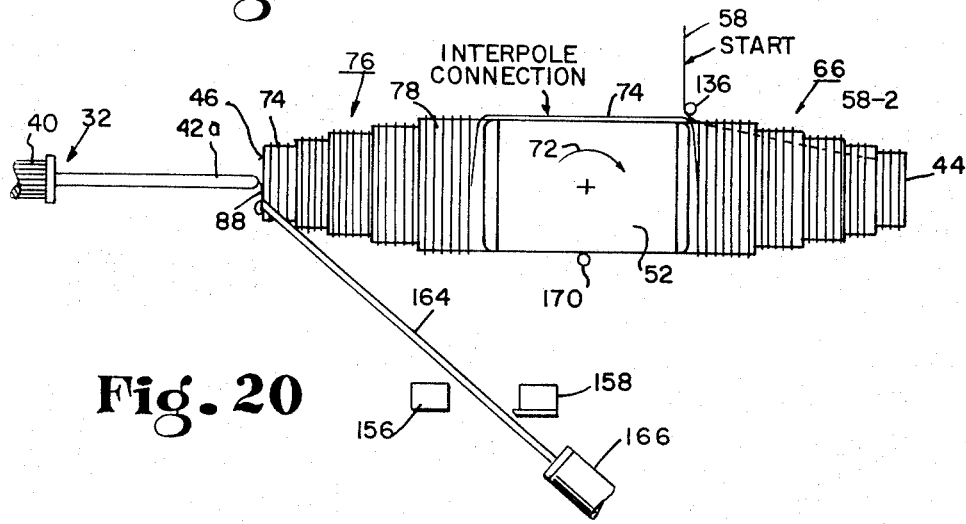
FIG. 20 is a top view similar to FIG. 18 showing the apparatus upon completion of the winding of the smallest coil of the second pole group.
Figure 21:
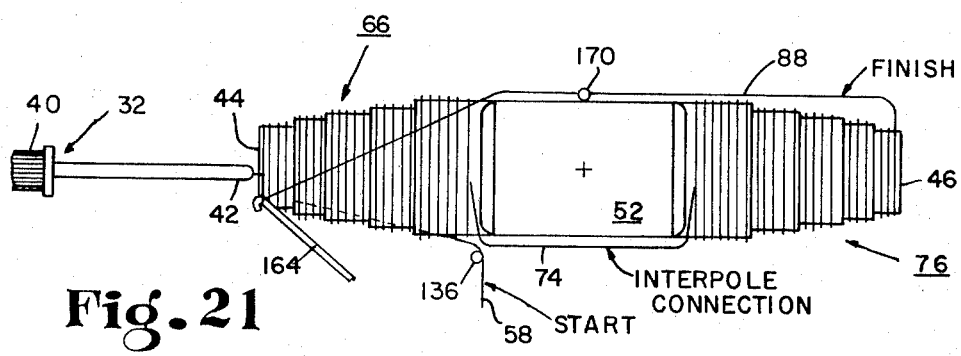
FIG. 21 is a top view similar to FIG. 20 showing the coil forms indexed from the position shown in FIG. 20.

Referring now to FIGS. 20 and 21, upon completion of the winding of the smallest coil 84 on the smallest step 86 of coil form 46, flyer 32 is fully retracted to the position 42a shown in FIG. 20, and in dashed lines in FIG. 14, with gun 42 spaced forwardly out of winding relationship with the smallest step 86 and in its upper position. Cylinder 166 is then actuated to extend hook 164 through the opened cut-off and clamping blocks 156, 158 forwardly and upwardly (FIG. 13) to engage finishing end 88 of the wire which extends from gun 42. Turret 52 is then again indexed, as shown by arrow 72, thereby to rotate coil form 44 with the pole group of coils 66 thereon to the winding position and to rotate coil form 46 with the pole group of coils 78 thereon to the inactive position. This indexing of turret 52 pulls out wire from gun 42 thereby causing finishing end 88 to cross around the side of turret 52 opposite interpole connection 74, finishing end 88 being engaged and retained by a coil spring 170 on the side of turret 52.

Figure 22:
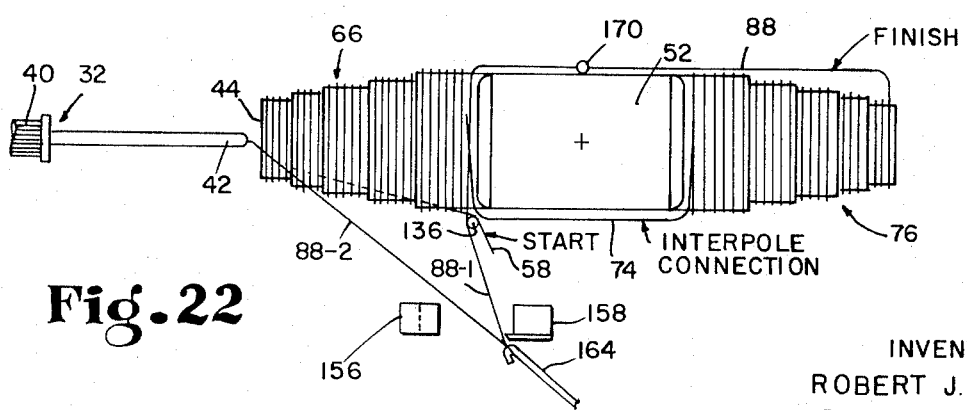
FIG. 22 is a top view similar to FIG. 21 showing the operation of the cut-off and clamping mechanism.

Referring now to FIGS. 22 and 23, cylinder 166 is then actuated to retract hook 164 downwardly away from gun 42 thereby pulling further wire from gun 42 to define finishing end section 88-1 extending from hook 164 around turret 52, and section 88-2 extending from hook 164 to gun 42. Hook 164 retracts through the opened cut-off and clamping blocks 156, 158. Block 156 has a cut-out portion 172 formed therein while block 158 has a cutting blade 174 secured thereto (FIG. 23). When hook 164 is fully retracted, finishing end section 88-2 extends from hook 164 to gun 42 between the clamping edges 176, 178 of blocks 156, 158 while section 88-1 extends from hook 164 to turret 52 beneath clamping section 176. Cylinder 162 is then actuated to close blocks 156, 158 thereby causing blade 174 to cut-off section 88-2 which is then clamped between edges 176, 178, while section 88-1 extends through cut-out portion 172 and thus is not clamped.

Coil forms 44, 46 with the pole groups of coils 66, 76 wound thereon are then simultaneously pivoted downwardly to their unloading positions, rails 106 and block 104 are then extended and turret 52 is lowered thereby to position the coil forms in coil-transferring relationship with inserter blades 90, as shown in dashed lines in 44b, 46b in FIG. 12. Coil-transferring sleeve 132 is then lowered from its inactive position to its coil-transferring position, as shown at 132a, and the pole groups of coils 66, 76 are then transferred from the coil forms to the inserter blades 90, as above described.

Referring briefly again to FIG. 14, it will be observed that when gun 42 is in its fully retracted position, as shown in dashed lines at 42a, the clamped finishing end section 88-2, which will become the new starting end 58, is clear of rod 136 in its longitudinally extending position, thereby permitting coil form 44 to be pivoted downwardly to its unloading position without rod 136 engaging finishing end section 88-2. Upon completion of transfer of the coils from the coil forms 44, 46 to inserter blades 90, turret 52 and the coil forms are again raised, and rods 106, 108 and block 104 are retracted. Flyer 32 is then extended from its fully retracted position to its initial position in winding relationship with the smallest coil form step 54 as shown in FIGS. 14 and 15, thus moving the new starting end 58 of the wire over rod 136, as above described and shown in FIG. 14. Coil forms 44, 46 are then simultaneously raised from their downwardly extending, unloading position to their upper, longitudinally extending positions at which point a new winding operation is commenced.

Referring now to FIGS. 24 through 27 in which another embodiment of the apparatus and method of the invention is shown, here, clamping and cut-off mechanism 176 is positioned between coil form parts 44-1, 44-2 and is movable between an extended position adjacent forward end 178 of coil form 44 and a retracted position by a suitable fluid power cylinder 180. Mechanism 176 includes clamping and cut-off blocks 182, 184 actuated between open and closed positions by another fluid power cylinder 186. The smallest coil form part 54-1 has a notch 188 formed in its front end 178.

Initially, mechanism 176 is extended by cylinder 180 and with gun 42 of flyer 32 in its upper position, starting end 58 is clamped by the closed blocks 182, 184 and extends upwardly past notch 188. Mechanism 176 is then retracted by cylinder 180 thereby to withdraw wire from gun 42 and to pull starting end rearwardly between coil form parts 44-1, 44-2, as shown by arrow 190. Flyer 32 and gun 42 are then rotated in direction 148 thereby to wind the smallest coil 70 on the smallest coil form 54. Following winding of the smallest coil 70 on the smallest coil form step 54, the flyer is stepped rearwardly and the largest coil is wound on the largest coil form step 56, only two coil form steps being shown in the illustrated embodiment. On completion of winding of the first pole group 66, turret 52 is indexed as shown by the arrow 72, thereby forming interpole connection 74. Winding of the second pole group 76 then proceeds commencing with the largest coil 78 and concluding with the smallest coil 84.

Hook 164 is again provided actuated by fluid power cylinder 166 (FIGS. 13, 15, 17, 20) between a retracted position clear of the path of rotation of flyer 32 and an extended position. At the conclusion of winding of the smallest coil 84 of the second pole group 76, flyer 32 is stopped with gun 42 in its upper position 42-1. Cylinder 166 is then actuated to extend hook 164 to engage finishing end 88 of the wire extending from gun 42, as seen in FIG. 25. Turret 52 is then indexed pulling out the finishing end 88. Cylinder 166 is then actuated to retract hook 164 thus pulling finishing end section 88-2 which extends from gun 42 between cut-off and clamping blocks 156, 158 in FIG. 26. Cylinder 162 (FIGS. 15, 16) is then actuated to close blocks 156, 158 to cut finishing end section 88-1 and to clamp section 88-1.

Cylinder 186 is then actuated to open blocks 182, 184 to release starting end 58 of the completed coils and cylinder 180 is then actuated to extend mechanism 176 to its forward position, as shown by arrow 196 in FIG. 27. The completed coils are then removed from coil forms 44, 46 in any desired manner. Flyer 32 is then rotated slowly in direction 148 thereby to rotate gun 42 from its upper position 42-1 to a lower position 42b as shown. Cylinder 198 is then actuated to extend hook 200 forwardly between the opened cut-off and clamping blocks 182, 184 to engage finishing end section 88-2. Cylinder 198 is then actuated to retract hook 200 which pulls finishing end section 88-2 between blocks 182, 184. Cylinder 186 is then actuated to close blocks 182, 184 so that knife 202 severs finishing end section 88-2 and clamps a new starting end 58 for the next set of coils.

Blocks 156, 158 are then opened to release the completely severed finishing end section 88-2 which falls out of the way. Flyer 32 is then again rotated in direction 148 thereby to rotate gun 42 from its position 42b to its initial upper position 42-1 which will bring the new starting end 58 into engagement with notch 188 and the winding of the next set of coils proceeds, as above described.

It will now be seen that there is provided in accordance with the invention a method and apparatus wherein the winding of field coils for a two pole dynamoelectric machine may be accomplished proceeding from the smallest coil to the largest coil of the first pole group and then from the largest coil to the smallest coil of the second pole group so that the interpole connection extends directly between the largest coils of the two pole groups rather than from the smallest coil of one pole group to the largest coil of the other as has heretofore been the case.

While there have been described above the principles of this invention in connection with specific apparatus, it is to be clearly understood that this description is made only by way of example and not as a limitation to the scope of the invention.

What is claimed is:

1. Apparatus for winding field coils for a two pole dynamoelectric machine stator core member, said field coils comprising first and second pole groups of coils each having a plurality of progressively smaller concentric coils, said apparatus comprising first and second stepped, collapsible coil forms each having a forward distal end and a rear proximal end which is mounted on a rotatable turret, the smallest step of each coil form being adjacent its distal end and the largest step adjacent its proximal end; a rotatable flyer for winding wire on said coil forms, said flyer when rotated describing a cylindrical path of rotation about an axis; means for rotating said turret thereby sequentially to position said coil forms in winding relationship with said flyer, said axis extending through the one coil form which is in winding position from said distal to said proximal end thereof and said path of rotation surrounding said coil form, said flyer including means for withdrawing wire from a source thereof whereby upon securing a starting end of said wire which extends from said flyer and rotating said flyer said wire is wound on said one coil form to form a respective group of said coils; and means for holding said starting end of said wire at a location adjacent said smallest step of said one coil form in its winding position and within said path of rotation of said flyer whereby the smallest coil may initially be wound upon the smallest step of said one coil form and the larger coils of the respective group wound progressively rearwardly toward said proximal end of said one coil form.

2. The apparatus of claim 1 wherein each of said coil forms comprises first and second longitudinally extending parts which are transversely spaced-apart to define a slot, said holding means being positioned in said slot of said one coil form.

3. The apparatus of claim 2 further comprising means for retracting said holding means in said slot rearwardly toward the proximal end of said one coil form thereby to pull said starting end rearwardly in said slot whereby said larger coils are wound over said starting end.

4. The apparatus of claim 2 wherein the distal end of said one coil form has means thereon for engaging said starting end of said wire, and means for rotating said flyer in a direction such that said starting end engages said engaging means and is then wound around said smallest step.

5. The apparatus of claim 1 further comprising second means for holding said starting end at another location rearwardly from said first-named location in a direction toward said proximal end of said one coil form and within said path of rotation of said flyer whereby said larger coils are wound over said starting end.

6. The apparatus of claim 1 wherein said holding means is selectively movable between an inactive position clear of said path of rotation of said flyer and an active position which establishes said location adjacent the rear end of the smallest step of said one coil form.

7. The apparatus of claim 6 where said flyer is axially movable between retracted and extended positions thereby to wind said coils on said coil form steps, said retracted and extended positions being respectively axially spaced from and adjacent said proximal end of said one coil form, said flyer being in its retracted position and clear of said holding means in its active position when winding said smallest coil on said one coil form, and further comprising means for securing said starting end at a first point rearwardly of the path of rotation of said flyer in its extended position in a direction toward said proximal end of said one coil form, and means for guiding said starting end from said first point forwardly within the path of rotation of said flyer in a direction toward said distal end of one coil form to said holding means in its active position whereby upon movement of said holding means to its inactive position following winding of said smallest coil the larger coils are wound over said starting end.

8. The apparatus of claim 7 wherein said guiding means is mounted on said one coil form at a second point adjacent the proximal end thereof and guides said starting end from said first point to said second point and thence forwardly in a direction toward said distal end along the side of said one coil form to said holding means in its active position.

9. The apparatus of claim 8 wherein each of said coil forms comprises two longitudinally extending parts which are transversely spaced-apart in the expanded position of the coil form to define a slot, said guiding and holding means guiding said starting end of said wire forwardly toward said distal end of said one coil form and holding the same adjacent said slot whereby said wire is pushed into said slot as said larger coils are wound thereover.

10. The apparatus of claim 9 wherein said guiding means comprises a first rod extending generally transversely with respect to said one coil form; said holding means comprising a second rod which in said active position thereof extends laterally into said slot, and means for selectively extending said second rod to said active position and retracting the same to said inactive position; and further comprising means for rotating said flyer in a direction such that said starting end of said wire is carried over said second rod and thence around said smallest step.

11. The apparatus of claim 10 wherein each of said coil forms is pivotally mounted on said turret for movement between a first unloading position in which said coil forms extend vertically downwardly with respect to said axis and are parallel and closely adjacent, and a second longitudinally extending position, each of said coil forms being in its second position when in its winding position, said first rod extending longitudinally forwardly toward said flyer when said one coil form is in its first position with said starting enc extending directly from said flyer over said first rod to said first point, movement of said one coil form to said second position thereof causing said first rod to engage said starting end thereof to define said second point.

* * * * *